United States Patent
Van De Sluis et al.

(10) Patent No.: US 9,485,837 B2
(45) Date of Patent: Nov. 1, 2016

(54) LIGHTING APPLICATION FOR AN INTERACTIVE ELECTRONIC DEVICE

(71) Applicant: KONINKLIJKE PHILIPS N.V., Eindhoven (NL)

(72) Inventors: Bartel Marinus Van De Sluis, Eindhoven (NL); Dzmitry Viktorovich Aliakseyeu, Eindhoven (NL); Tatiana Aleksandrovna Lashina, Eindhoven (NL); Tim Dekker, Eindhoven (NL); Dirk Valentinus Rene Engelen, Heusden-Zolder (BE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/399,684

(22) PCT Filed: Apr. 23, 2013

(86) PCT No.: PCT/IB2013/053189
§ 371 (c)(1),
(2) Date: Nov. 7, 2014

(87) PCT Pub. No.: WO2013/168034
PCT Pub. Date: Nov. 14, 2013

(65) Prior Publication Data
US 2015/0130373 A1    May 14, 2015

Related U.S. Application Data

(60) Provisional application No. 61/643,967, filed on May 8, 2012.

(51) Int. Cl.
*H05B 37/02* (2006.01)
*G08C 17/02* (2006.01)

(52) U.S. Cl.
CPC .......... *H05B 37/0227* (2013.01); *G08C 17/02* (2013.01); *H05B 37/0236* (2013.01); *H05B 37/0272* (2013.01); *H05B 37/0281* (2013.01); *G08C 2201/93* (2013.01)

(58) Field of Classification Search
CPC .......... H05B 37/0227; H05B 37/0272; H05B 37/0281; G08C 17/02
See application file for complete search history.

(56) References Cited

U.S. PATENT DOCUMENTS

2002/0167488 A1    11/2002    Hinckley et al.
2004/0212323 A1    10/2004    Gutta et al.
(Continued)

FOREIGN PATENT DOCUMENTS

| EP | 0919906 A2 | 6/1999 |
|---|---|---|
| WO | 2007072291 A2 | 6/2007 |
| WO | 2007072314 A1 | 6/2007 |

OTHER PUBLICATIONS

"Support for Context Monitoring and Control".
AVAGO Technologies, "Intelligent Sensing with Ambient Light and Optical Proximity Sensors", Application Reference Guide.

*Primary Examiner* — Tung X Le
*Assistant Examiner* — Raymond R Chai
(74) *Attorney, Agent, or Firm* — Meenakshy Chakravorty

(57) ABSTRACT

Methods and apparatus, including computer program products, for a lighting application for an interactive electronic device. A system includes an interactive electronic device remotely linked to a lighting system, the interactive electronic device including a processor, a memory, the memory including an operating system, one or more user applications and an interactive lighting process, a user interface, one or of the interactive more sensors, a communications device, and the lighting system including a light controller linked to a light-emitting unit, the light controller including a communications device responsive to one or more lighting adjustment signals received from the interactive lighting process. The interactive lighting process includes detecting a context of the interactive electronic device, and transmitting a lighting adjustment signal from the communications device to a light controller of a lighting system in response to the detected context.

15 Claims, 2 Drawing Sheets

(56) References Cited

U.S. PATENT DOCUMENTS

| | | |
|---|---|---|
| 2007/0075965 A1 | 4/2007 | Huppi et al. |
| 2010/0088140 A1* | 4/2010 | Gil et al. .......................... 705/8 |
| 2010/0141153 A1* | 6/2010 | Recker et al. ................ 315/149 |
| 2011/0101871 A1 | 5/2011 | Schenk et al. |
| 2012/0087113 A1* | 4/2012 | McClellan .................... 362/147 |
| 2013/0249410 A1* | 9/2013 | Thompson .................... 315/158 |

* cited by examiner

LIGHTING APPLICATION FOR AN INTERACTIVE ELECTRONIC DEVICE

CROSS-REFERENCE TO PRIOR APPLICATIONS

This application is the U.S. National Phase application under 35 U.S.C. §371 of International Application No. PCT/IB2013/053189, filed on Apr. 23, 2013, which claims the benefit of U.S. Provisional Patent Application No. 61/643,967, filed on May 8, 2012. These applications are hereby incorporated by reference herein.

BACKGROUND OF THE INVENTION

The present invention generally relates to lighting systems, and more particularly to a lighting application for an interactive electronic device.

Lighting systems enable a particular space, such as an office, shop, private place, public place, and so forth, to become a more natural environment by creating lighting conditions familiar and attractive to people. Further, people appreciate appropriate, personalized lighting that optimally supports their daily rhythms and their current activities.

Some conventional lighting systems allow manual control of light sources, such as dimming, switching on/off and color adjustments in order to provide an enriching experience and improve productivity, safety, efficiency and relaxation.

Lighting can have a significant impact on concentration and productivity for people working at home, at an office or studying at school, university, and college or training centers. A significant value can be created by applying appropriate lighting in environments where people are studying, generating knowledge and running their businesses.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for a lighting application for an interactive electronic device.

In general, in one aspect, the invention features a system (10) including an interactive electronic device (12) remotely linked to a lighting system (14), the interactive electronic device (12) including a processor (16), a memory (18), the memory including an operating system (26), one or more user applications (28) and an interactive lighting process (100), a user interface (20), one or more sensors (22), a communications device (24), and the lighting system (14) including a light controller (50) linked to a light-emitting unit (52), the light controller (50) including a communications device (54) responsive to one or more lighting adjustment signals received from the interactive lighting process (100).

In another aspect, the invention features a method including, in an interactive electronic device having a processor (16), memory (18), one or more sensors (22) and a communications device (24), detecting (102) a context of the interactive electronic device, the context representing a signal characteristic of the interactive electronic device (12), and transmitting (104) a lighting adjustment signal from the communications device (24) to a light controller (50) of a lighting system (14) in response to the detected context.

The foregoing and other objects, features, aspects and advantages of the present invention will become more apparent from the following detailed description of the present invention when taken in conjunction with the accompanying drawings.

BRIEF DESCRIPTION OF THE DRAWINGS

The invention will be more fully understood by reference to the detailed description, in conjunction with the following figures, wherein.

DETAILED DESCRIPTION

Figure 1:
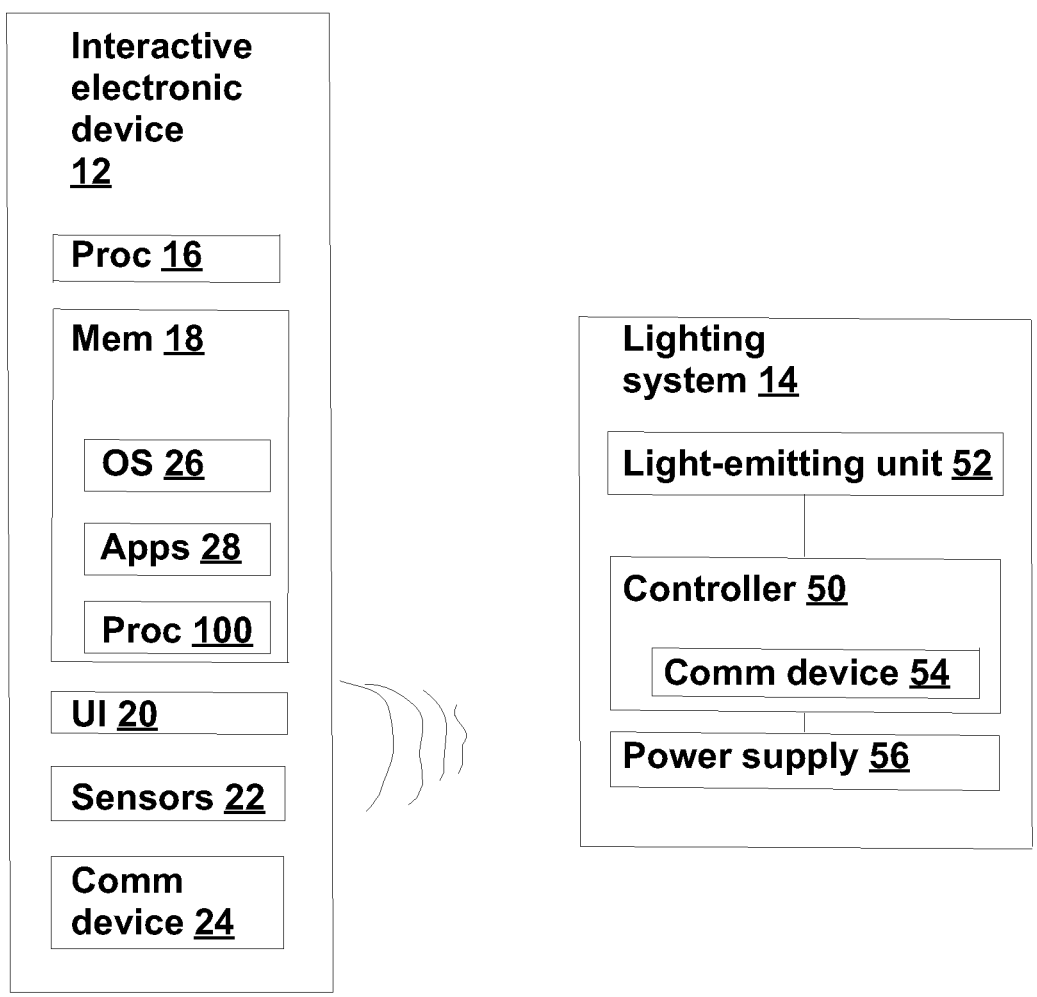
FIG. 1 is a block diagram of a system according to one embodiment of the invention

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As shown in FIG. 1, an exemplary system 10 includes an interactive electronic device 12 and a lighting system 14. Example interactive electronic devices include a personal computer (PC), a laptop computer, a netbook computer, a mobile device, a tablet computer, a smartphone, a personal data assistant (PDA), a wrist/sport watch device, a head-mounted device, an ear-mounted devices, Near Field Communication (NFC) device, and so forth.

The interactive electronic device 12 includes a processor 16, a memory 18, a user interface (e.g., display) 20, one or more sensors 22 and a communications device 24, such as a wireless network device (e.g., WiFi), wireless Bluetooth device (e.g., Bluetooth) and/or infrared transmitting unit. The memory 18 includes an operating system 26, one or more user applications 28 and an interactive lighting process 100. The one or more sensors 20 can include a camera, a Global Positioning System (GPS), a microphone, a light sensor, a physiological sensor, a gaze tracking sensor, an accelerometer, and so forth. The one or more user applications 28 can include a browser process, personal information management (PIM) process, and so forth.

The lighting system 14 includes a light controller 50 linked to a light-emitting unit 52 (e.g., a light emitting diode, an organic light emitting diode, a thin film transistor, and so forth). The light controller 50 controls the light-emitting unit 52 such that its intensity or other light effect property may be altered. For example, the light controller 50 may cause the light-emitting unit 52 to dim brightness or intensify brightness. The light controller 50 includes a communications device 54, such as a wireless network device (e.g., WiFi), Bluetooth device (e.g., Bluetooth), infrared receiving unit, and so forth. In general, light controllers typically have software components for configuring fixtures and designing and editing light shows, and hardware components for sending control data to fixtures. Controllers/drivers are typically used for blinking, dimming, and color mixing lights. Example light controllers include the Video System Manager Pro, the Light System Manager controller (LSM), and the ColorDial Pro, all from Koninklijke Philips Electronics N.V. of Eindhoven, NL.

The communication device 54 of light controller 50 is adapted to receive one or more lighting adjustment signals from the communications device 24 of the interactive electronic device 12, causing the light controller 50 to alter the intensity or other light effect property of the light-emitting unit 52 of the lighting system 14 in response to the received lighting adjustment signal. The lighting system 14 includes a power supply 56.

Figure 2:
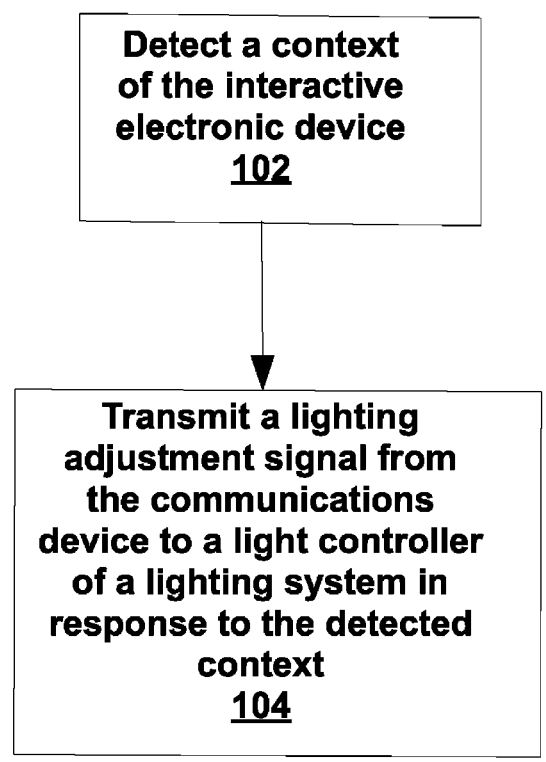
FIG. 2 is a flow diagram of a method according to one embodiment of the invention.

As shown in FIG. 2, the interactive lighting process 100 includes detecting (102) a context of an interactive electronic device. The context represents a signal characteristic of the interactive electronic device (12). Detecting (102) the context can include detecting sounds from a surrounding environment with a microphone in the electronic device and processing the detected sounds with a audio-scene classification process to determine information on a user's activity or mental state.

In this example, the microphone or other sensor of the interactive electronic device 12 is used to pick up sounds from the surrounding environment of the interactive electronic device 12. The detected sounds are processed with the audio-scene classification algorithm in order to derive information on the user's activity, mental state and/or social setting from the acoustic data. For instance, in an office environment, the sounds of various people talking may indicate that there is a meeting taking place. Or the sound of a projector and a single person talking may indicate that a presentation is being given. Each classified audio scene can be associated with specific lighting settings which may be predefined for example, in a look up table (LUT) in the interactive electronic device 12 that correlates specific sound levels with specific lighting conditions, or adjusted by the user based on his or her preferences.

Detecting (102) the context can include detecting an amount or pattern of movement of the interactive electronic device 12 over a predetermined period of time with a Global Positioning System (GPS) in the interactive electronic device 12. Detection (102) of the amount of movement or (time zone) traveling the user of the interactive electronic device 12 is measured over the last day(s), for example. For instance, a mobile interactive electronic device 12 with GPS can detect that a user has travelled across several time zones and can determine a "light recipe" to optimally adapt the user's circadian rhythm to the current time zone. In one example, the amount of movement of the interactive electronic device 12 is correlated with specific lighting conditions in a LUT stored in the interactive electronic device 12.

Detecting (102) the context can include determining a scheduled activity by acquiring one or more properties of the scheduled activity from an electronic calendar (28) resident in the interactive electronic device (12) and adjusting the lighting adjustment signal in response to the acquired one or more properties. The acquired one or more properties may include a type of the activity, a state of the activity, a length of the activity, user inputs related to the activity and/or a currently displayed context.

For example, a user can be involved in a meeting planned with twelve invitees, in contrast to having an informal lunch, and the lighting settings can be adapted to the type of activity that is being scheduled in the electronic calendar. In one example, types of scheduled activities are correlated with specific lighting conditions in a LUT stored in the interactive electronic device 12.

In another example, the amount, length and type of scheduled activities in an electronic calendar user application can be a predictor of a workload for a particular day. Similarly, when a user starts handling his or her incoming messages, the amount of new messages can be an indicator for the workload in the coming hour(s). Based on those predicted workloads, the lighting conditions can be adapted. For instance, increased lighting conditions can provide an extra boost during periods of high workload, or to dim back the light when those periods come to an end.

Detecting (102) the context can include determining a current user activity by detecting an executing user application in the interactive electronic device 12.

For example, a main activity the user has at a particular moment may involve the interactive electronic device 12 itself. For instance, the user may be watching a movie on an electronic tablet, involved in a video communication session or reading an e-book. Detecting (102) may provide default lighting settings for those activities. For instance, the lighting for a movie can be dimmed and cozy, whereas for a video communication session involving two or more users to be effective, there may need to be a certain amount of light on the user's face to be seen properly by all others remote in the video communication session. In this example, user activities can be associated with specific lighting conditions in a table stored in the interactive electronic device 12.

The context can be influenced or specified by user preferences stored in the interactive electronic device 12, e,g, a user may indicate desired lighting properties per application or specify lighting conditions (e.g., intensity, color temperature, color, and so forth) that are associated with certain activities. In one example, process 100 displays a graphical user interface (GUI), such as a dashboard, which enables a user to select or associate certain lighting condition preferences with certain general or specific activities.

The interactive lighting process 100 includes transmitting (104) a lighting adjustment signal to a lighting system 14 in response to the detected context. The lighting adjustment signal can be a Bluetooth signal, a WiFi signal, visible coded light or invisible coded light. The transmitted lighting adjustment signal is received by the communication device 54 of the light controller 50 and the light-emitting unit 52 adjusted in response.

Other embodiments are possible. For example, in environments where multiple interactive electronic devices are being used to control the lighting conditions, conflicts may arise when multiple users (through their interactive electronic devices) require different lighting conditions. Here, each user may control one or more lighting systems centered around him or her. The farther the light system is away from the user the less influence he/she has on the light conditions. Alternatively, in such conflicting multi-user cases, process 100 may inform the user about it, and not transmit a lighting adjustment signal to the lighting system 14.

While the invention has been illustrated and described in detail in the drawings and foregoing description, such illustration and description are to be considered illustrative or exemplary and not restrictive; the invention is not limited to the disclosed embodiments. Variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

However, there may also systems/solutions where the mobile device simply communicates the context information to a lighting controller, and the lighting controller may translate this into a lighting adjustment. Therefore, it may be better to change the term "lighting adjustment signal" in claim 1 into "data signal" and explain the two different solutions in the description, or have a dependent claim indicating that the data signal can be lighting adjustment signal.

What is claimed is:

1. A method comprising:
   in an interactive electronic device comprising a processor, memory, a Global Positioning System (GPS), one or more sensors and communications device, detecting a context of the interactive electronic device, the context representing a signal characteristic of the interactive electronic device received by the one or more sensors and interpreted to determine the activity, mental state, and/or social setting of a user;
   wirelessly transmitting one or more data signals from the communications device to a light controller of a lighting system in response to the detected context,
   determining an amount or pattern of movement of the interactive electronic device outside of the lighting area, and
   adjusting the one or more data signals in response to the determined amount of movement or pattern outside of the lighting area.

2. The method of claim 1 wherein the interactive electronic device is selected from the group consisting of a personal computer (PC), a laptop computer, a netbook computer, a mobile device, a tablet computer, a smartphone, a personal data assistant (PDA), a wrist/sport watch device, a head-mounted device and an ear-mounted device.

3. The method of claim 1 wherein at least one of the one or more data signals is a lighting adjustment signal, and wherein the light controller is interoperable with a communication device adapted to receive the one or more transmitted data signals and cause the light controller to adjust a light effect property of a light-emitting unit in the lighting system in response to the one or more data signals.

4. The method of claim 3 wherein the lighting adjustment signal is influenced by user preferences.

5. The method of claim 4 wherein the user preferences are inputted by a user.

6. The method of claim 1 wherein the detected context is the location information.

7. The method of claim 1 wherein detecting a context of the interactive electronic device comprises:
   detecting sounds from a surrounding environment with a microphone in the interactive electronic device;
   processing the detected sounds with an audio-scene classification process to determine information on a user's activity or mental state; and
   adjusting the one or more data signals in response to the determined information of the user's activity or mental state.

8. The method of claim 1 wherein detecting a context of the interactive electronic device comprises:
   determining a scheduled activity by acquiring one or more properties of the scheduled activity from an electronic calendar resident in the interactive electronic device; and
   adjusting the one or more data signals in response to the acquired one or more properties.

9. The method of claim 8 wherein the acquired one or more properties is a type of the activity, a state of the activity, a length of the activity, user inputs related to the activity or a currently displayed context.

10. The method of claim 1 wherein detecting a context of the interactive electronic device comprises:
    determining a current activity by detecting an executing application in the interactive electronic device; and
    adjusting the one or more data signals in response to the determined current activity.

11. The method of claim 1 wherein at least one of the one or more data signals is a lighting adjustment signal.

12. A method comprising:
    in an interactive electronic device comprising a processor, memory, Global Positioning System (GPS) and communications device, detecting an amount or pattern of movement of the interactive electronic device outside of a lighting area over a predetermined period of time with the Global Positioning System (GPS) in the interactive electronic device;
    adjusting a lighting adjustment signal in response to the determined amount of movement or pattern; and
    wirelessly transmitting the lighting adjustment signal from the communications device to a light controller of a lighting system in the lightning area in response to the determined amount of movement or pattern outside of the lighting area.

13. A system comprising:
    an interactive electronic device remotely linked to a lighting system, the interactive electronic device comprising:
    a processor;
    a memory, the memory including an operating system, one or more user applications and an interactive lighting process;
    a user interface;
    one or more sensors configured to detect a signal characteristic of the interactive electronic device;
    a communications device; and
    wherein the processor is configured to detect a context of the interactive electronic device based on the detected signal, and wherein the interactive electronic device is configured to wirelessly transmit one or more lighting adjustment signals from the communications device to the lighting system in response to the detected context; and
    the lighting system comprising a light controller linked to a light-emitting unit, the light controller including a communications device responsive to the one or more lighting adjustment signals received from the interactive lighting process;
    wherein the interactive electronic device further comprises a Global Positioning System (GPS) and wherein the interactive electronic device is configured to detect an amount or pattern of movement of the interactive electronic device outside of a lighting area over a predetermined period of time and adjust the one or more lighting adjustment signals in response to the determined amount of movement or pattern outside of the lighting area.

14. The system of claim 13 wherein the interactive electronic device is selected from the group consisting of a personal computer (PC), a laptop computer, a netbook computer, a mobile device, a tablet computer, a smartphone a personal data assistant (PDA), a wrist/sport watch device, a head-mounted device and an ear-mounted device.

15. The system of claim 13 wherein the transmitted lighting adjustment signal causes the light controller to adjust a light effect property of the light-emitting unit.

* * * * *